US010626658B2

(12) United States Patent
Mayr

(10) Patent No.: US 10,626,658 B2
(45) Date of Patent: Apr. 21, 2020

(54) CONTROL DEVICE FOR A VEHICLE HAVING AN AUTOMATICALLY CLOSING HATCH

(71) Applicant: Bayerische Motoren Werke Aktiengesellschaft, Munich (DE)

(72) Inventor: Juergen Mayr, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 226 days.

(21) Appl. No.: 15/669,367

(22) Filed: Aug. 4, 2017

(65) Prior Publication Data
US 2017/0335616 A1 Nov. 23, 2017

Related U.S. Application Data

(63) Continuation of application No. PCT/EP2016/052159, filed on Feb. 2, 2016.

(30) Foreign Application Priority Data

Feb. 6, 2015 (DE) .................. 10 2015 202 164

(51) Int. Cl.
*E05F 15/40* (2015.01)
*G05B 19/042* (2006.01)
(Continued)

(52) U.S. Cl.
CPC .............. *E05F 15/40* (2015.01); *E05F 15/41* (2015.01); *E05F 15/73* (2015.01); *G05B 19/042* (2013.01);
(Continued)

(58) Field of Classification Search
CPC ........... E05F 15/40; E05F 15/73; E05F 15/41; G05B 19/042; G05B 2219/2637; E05Y 2400/57; E05Y 2400/44; E05Y 2900/546
See application file for complete search history.

(56) References Cited

U.S. PATENT DOCUMENTS 6,100,658 A * 8/2000 Kume .................... B60J 7/0573
318/266
2001/0045775 A1* 11/2001 Mittermeier ............ E05F 15/40
307/9.1
(Continued)

FOREIGN PATENT DOCUMENTS

CN 101474957 A 7/2009
CN 102261210 A 11/2011
(Continued)

OTHER PUBLICATIONS

International Search Report (PCT/ISA/210) issued in PCT Application No. PCT/EP2016/052159 dated May 2, 2016 with English translation (five pages).
(Continued)

*Primary Examiner* — Alan D Hutchinson
(74) *Attorney, Agent, or Firm* — Crowell & Moring LLP

(57) ABSTRACT

The control device relates to a vehicle having an automatically closing hatch, including at least one operating switch for outputting a closing command to automatically close the hatch by way of at least one actuator, a monitoring device for recognizing a blocking or jamming event during the closing procedure and a programmable electronic control unit which is connected with both the operating switch and the monitoring device, and which detects the vehicle speed as an input signal. The monitoring device is designed such that a risk of jamming can be recognized by monitoring the current curve and/or the rotational speed curve of the actuator. The control unit is programmed so as to only stop the closing procedure on recognition of a risk of jamming if the vehicle speed is less than a specified threshold value. Additionally or alternatively, the control unit is programmed so as to initially only react to the occurrence of comparatively large speed or current fluctuations by terminating the automatic closing (Continued)

procedure, for a certain time window and/or for a given distance covered by the tailgate, if the vehicle speed is above a specified threshold.

6 Claims, 1 Drawing Sheet

(51) Int. Cl.
*E05F 15/41* (2015.01)
*E05F 15/73* (2015.01)

(52) U.S. Cl.
CPC ....... *E05Y 2400/44* (2013.01); *E05Y 2400/57* (2013.01); *E05Y 2900/546* (2013.01); *G05B 2219/2637* (2013.01)

(56) References Cited

U.S. PATENT DOCUMENTS

| | | |
|---|---|---|
| 2006/0290309 A1 | 12/2006 | Saitou et al. |
| 2006/0293821 A1 | 12/2006 | Takahashi |
| 2014/0239867 A1 | 8/2014 | Bessho et al. |
| 2015/0330135 A1 | 11/2015 | Mayr |

FOREIGN PATENT DOCUMENTS

| | | |
|---|---|---|
| CN | 203175246 U | 9/2013 |
| CN | 203964926 U | 11/2014 |
| DE | 10 2006 029 460 A1 | 1/2007 |
| DE | 10 2009 035 321 A1 | 3/2011 |
| DE | 10 2009 043 037 A1 | 4/2011 |
| DE | 10 2010 038 705 A1 | 2/2012 |
| DE | 10 2013 201 436 A1 | 7/2014 |
| JP | 2007-9413 A | 1/2007 |

OTHER PUBLICATIONS

German-language Written Opinion (PCT/ISA/237) issued in PCT Application No. PCT/EP2016/052159 dated May 2, 2016 (five pages).

German Search Report issued in counterpart German Application No. 10 2015 202 164.5 dated Dec. 2, 2015 with partial English translation (12 pages).

Chinese-language Office Action issued in counterpart Chinese Application No. 201680006615.2 dated Jan. 17, 2018 with English translation (eight pages).

\* cited by examiner

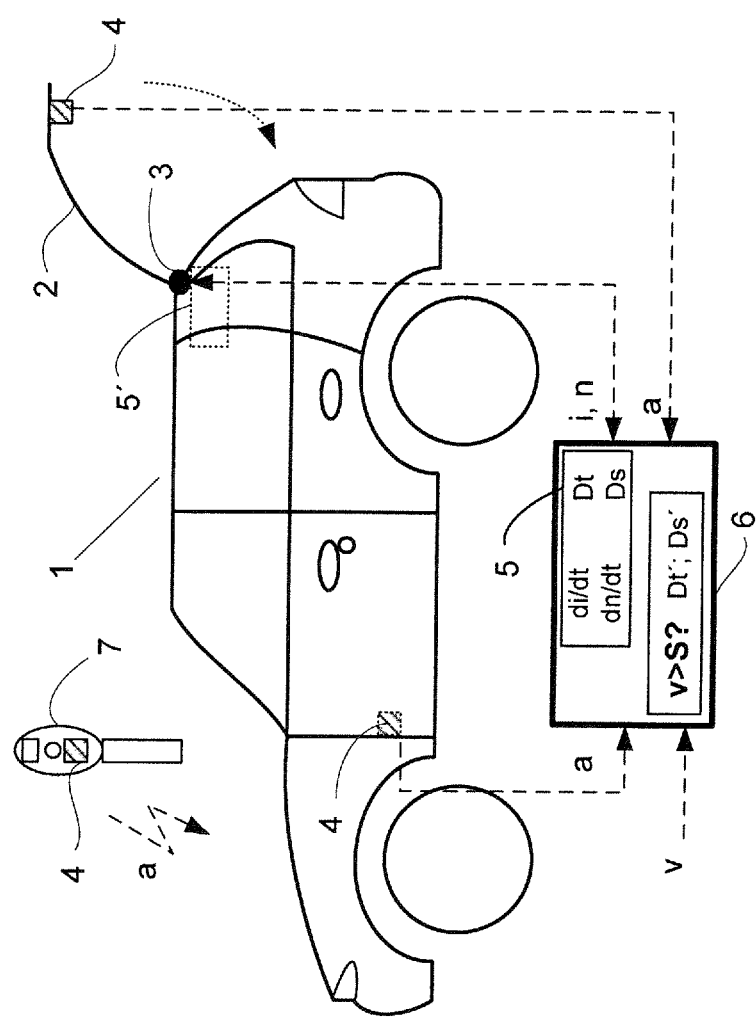

CONTROL DEVICE FOR A VEHICLE HAVING AN AUTOMATICALLY CLOSING HATCH

CROSS REFERENCE TO RELATED APPLICATIONS

This application is a continuation of PCT International Application No. PCT/EP2016/052159, filed Feb. 2, 2016, which claims priority under 35 U.S.C. § 119 from German Patent Application No. 10 2015 202 164.5, filed Feb. 6, 2015, the entire disclosures of which are herein expressly incorporated by reference.

BACKGROUND AND SUMMARY OF THE INVENTION

The invention relates to a control device for a vehicle with an automatically closing hatch, with at least one operating switch for outputting a closing command to automatically close the hatch by way of at least one actuator, with a monitoring device for recognizing a blocking or jamming event during the closing procedure, and with a programmable electronic control unit which is connected to both the operating switch and the monitoring device.

Such a control device is known in the context of an automatically controllable rear hatch, for example from DE 10 2010 038 705 A1. A jamming protection device is provided here, which causes a halting or reversal of the rear hatch during the closing procedure when a jamming situation is recognized.

As prior art, reference is also made to the vehicles of the Applicant having a so-called "Automatic rear hatch activation" (see, for example, the operating instructions for the BMW 5-er Touring, Vol. 2014, Online Order No. 01 40 2 924 124, p. 39 et seq.).

In the "automatic rear hatch activation" known from the vehicles of the Applicant, the rear hatch basically closes by itself, for example when a button provided on the inside of the rear hatch is pressed. The automatic closing procedure is then terminated, in particular, when the engine is started or when driving in reverse, since these situations lead to the recognition of a possible jamming situation, which is verified by a jamming protection device.

The problem on which the invention is based is to further develop a control device for the automatic closing of a hatch in terms of a more secure closing procedure.

According to the invention, the problem is solved by a control device for a vehicle with an automatically closing hatch, with at least one operating switch for outputting a closing command to automatically close the hatch by way of at least one actuator, with a monitoring device for recognizing a blocking or jamming event during the closing procedure, and with a programmable electronic control unit which is connected to both the operating switch and the monitoring device and which detects the vehicle speed as an input signal. The monitoring device is designed such that a risk of jamming is recognizable by monitoring the current curve and/or the rotary speed curve of the actuator. The control unit is programmed in such a way as to only stop the closing procedure on recognition of a risk of jamming if the vehicle speed is less than a predetermined threshold.

The problem is also solved by a control device for a vehicle with an automatically closing hatch, with at least one operating switch for outputting a closing command to automatically close the hatch by way of at least one actuator, with a device for monitoring a jamming during the closing procedure, and with a programmable electronic control unit which is connected to both the operating switch and the monitoring device and which detects the vehicle speed as an input signal. The monitoring device is designed such that a risk of jamming is recognizable by monitoring the current curve and/or the rotary speed curve of the actuator. The control unit is programmed in such a way as to initially only react to the occurrence of comparatively large speed or current fluctuations by terminating the automatic closing procedure, for a certain time window and/or for a given distance covered by the rear hatch, if the vehicle speed is above a predetermined threshold.

The invention is based on the following ideas.

Present-day vehicles with automatically closing rear hatches generally have several control logics in the control system for recognition of blocking or jamming events. These are essentially monitors of the rotary speed of the actuators and/or the electric current required by the actuators and/or the monitor of changes in these values over time (dn/dt or di/dt). By appropriately low trigger thresholds, the desired sensitive response in the event of a blocking or jamming can be achieved in the prior art in order to reduce the risk of injury or severity of injury to persons in the pivot zone of the rear hatch.

In order to achieve the most sensitive response possible for the blocking or jamming recognition, the trigger thresholds must be set relatively low. This, in turn, results in false-alarm blocking or jamming events in certain application situations, e.g., when driving the vehicle off or away or when driving over uneven ground, each time during an ongoing closing movement. The reason for this is that dynamics acting on the hatch (inertias or accelerations) when driving the vehicle off or when the road is uneven results in a transient change in the current uptake (di/dt) or transient fluctuations in rotary speed (dn/dt). As a result of such blocking event recognition, that means, for example, if the rise in current and/or the drop in rotary speed are beyond respectively defined threshold values, the actuators are halted or reversed. Thus, the closing procedure of the rear hatch is terminated. This may cause confusion and annoyance for the customer, since they must halt the vehicle and again initiate the closing procedure.

In order not to lose the desired sensitive response of the automatic rear hatch (a measure also applicable to other hatches, such as e.g. automatic sliding doors or side doors), according to the invention the information present anyway in the control system, such as the vehicle speed in particular, is intelligently interrelated as follows: by additional consideration of the vehicle speed, especially upon crossing a certain velocity threshold, the resulting fluctuation in rotary speed or current can be ignored, preferably at least for a certain time window and/or for a given distance of the rear hatch. In addition or alternatively, upon crossing a certain velocity threshold for a certain time window and/or for a given distance it can also respond initially only to larger rotary speed or current fluctuations than in the normal case, in order to switch the monitoring to a less sensitive state for a brief time.

The invention provides the advantage of preventing the erroneous termination of automatic closing procedures during the driving away of the vehicle and still with high quality of the blocking or jamming event recognition.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic diagram of an exemplary embodiment of the invention showing a vehicle with the essential components of the control device.

DETAILED DESCRIPTION OF THE DRAWING

Referring to FIG. 1, a vehicle 1 is outfitted with an at least automatically closing rear hatch 2. The driver-side foot space of the vehicle 1, a remote control 7, and/or the rear hatch 2 itself, have an operating switch 4 that output a closing command "a" for the automatic closing of the hatch 2 via at least one actuator 3. The operating switch 4, for example in the form of a push button, may also be installed in other locations including, without limitation, the driver-side doors or in the center console.

The control device according to the invention includes a corresponding programmable electronic control unit 6 and a jam monitoring device 5 and/or 5' provided inside or outside the control unit 6 for jam monitoring. The programmable electronic control unit 6 is connected to both the operating switch(es) 4 and the jam monitoring device 5 or 5' and it receives the vehicle speed v as an input signal. The monitoring device 5 or 5' is designed so that a jamming risk is recognizable by monitoring the current curve i or the rotary speed curve n of the actuator 3. The control unit 6 is programmed such that, upon recognizing a jamming risk, it only halts the closing procedure if the vehicle speed v is below a predetermined threshold S.

Preferably, when a vehicle speed v is present above the predetermined threshold of the current curve i or the rotary speed curve n of the actuator 3, the vehicle speed is ignored at least for a certain time window Dt' or a certain travel distance Ds'.

In addition or alternatively, the control unit can also respond initially only to the occurrence of comparatively large rotary speed fluctuations dn/dt or current fluctuations di/dt by terminating the automatic closing procedure, for a certain time window Dt and/or for a given distance Ds covered by the rear hatch 2, if the vehicle speed v is above a predetermined threshold S. That is, if the vehicle speed v lies below a predetermined threshold S, the control unit responds by terminating the automatic closing procedure basically upon occurrence of comparatively slight rotary speed fluctuations dn/dt or current fluctuations di/dt (see above on the prior art: comparatively low trigger thresholds).

The values Dt and Dt' as well as Ds and Ds' may be different or also the same in each case.

Different alternatives may also be provided for different vehicle speed thresholds.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit for a vehicle equipped with an automatically closing hatch, at least one operating switch that outputs a closing command to automatically close the hatch and at least one actuator configured to close the hatch, the control device comprising:
    a monitoring device that recognizes a blocking or jamming event during a closing procedure of the hatch, the monitoring device being configured to recognize a risk of jamming by monitoring at least one of a current curve and a rotary speed curve of the actuator;
    a programmable electronic control unit connected to both the operating switch and the monitoring device, wherein
    the control unit receives an input signal of the vehicle speed, and
    the control unit is programmed so as to only stop the closing procedure on recognizing, via the monitoring device, the risk of jamming if the vehicle speed is less than a predetermined threshold.

2. The control unit according to claim 1, wherein
    the control unit is programmed to ignore, at least for a certain time window or a certain travel distance of the vehicle, a vehicle speed present above the predetermined threshold of the current curve or the rotary speed curve of the actuator.

3. A control device for a vehicle equipped with an automatically closing hatch, at least one operating switch that outputs a closing command to automatically close the hatch, and at least one actuator configured to close the hatch, the control device comprising:
    a monitoring device that monitors jamming during a closing procedure of the hatch, wherein the monitoring device is configured to recognize a risk of jamming by monitoring at least one of a current curve and a rotary speed curve of the actuator; and
    a programmable electronic control unit connected to both the operating switch and the jam monitoring device, wherein
    the control unit receives an input signal of vehicle speed, and
    the control unit is programmed so as to initially only react to an occurrence of large rotary speed curve or current curve fluctuations by terminating the automatic closing procedure, for at least one of a certain time window and for a given distance covered by the hatch, if the vehicle speed is above the predetermined threshold.

4. The control device according to claim 3, wherein the hatch is a rear hatch of the vehicle.

5. A method of controlling an automatically closing hatch of a motor vehicle equipped with an operating switch that outputs a closing command to automatically close the hatch via an actuator, the method comprising the acts of:
    recognizing, via a monitoring device, a blocking or jamming event of the hatch during a closing procedure by monitoring at least one of a current curve and a rotary speed curve of the actuator; and
    only stopping the closing procedure upon recognizing a risk of the blocking or jamming event if a vehicle speed is less than a predetermined threshold.

6. A method of controlling an automatically closing hatch of a vehicle equipped with an operating switch that outputs a closing command to automatically close the hatch via an actuator, the method comprising the acts of:
    recognizing, via a monitoring device, a risk of jamming during the closing procedure by monitoring at least one of a current curve and a rotary speed curve of the actuator; and
    initially only reacting to an occurrence of large speed or current fluctuations by terminating the automatic closing procedure, for at least one of a certain time window and for a distance covered by the hatch, if a vehicle speed is above a predetermined threshold.

* * * * *